3,042,690
9 HALO-21-FLUORO-STEROIDS OF THE
PREGNANE SERIES
Josef Fried, Princeton, N.J., and Josef E. Herz, Lomas, Mexico, assignors to Olin Mathieson Chemical Corporation, New York, N.Y., a corporation of Virginia
No Drawing. Filed May 26, 1960, Ser. No. 31,825
4 Claims. (Cl. 260—397.45)

This application is a continuation-in-part of our parent applications, Serial No. 583,934, filed May 10, 1956, now Patent No. 2,973,376, granted February 28, 1961, and Serial No. 585,155, filed May 16, 1956, now Patent No. 2,973,356, granted February 28, 1961.

This invention relates to the synthesis of valuable steroids and has for its objects the provision of new steroids of the pregnene series, having a fluoro substituent in the 21-position, a halogen substituent in the 9α-position, and either a β-hydroxy or keto substituent in the 11-position.

The novel steroids of this invention can be represented by the general formula:

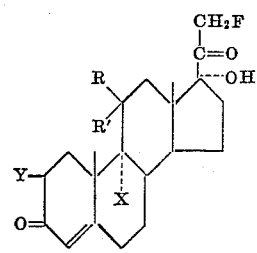

wherein Y is hydrogen or α-methyl; R. is hydrogen, R' is β-hydroxy, or together R and R' is keto; and X is halogen.

Representative steroids preparable by the process of this invention include:

9α-halo-21-fluoro-11β,17α-dihydroxyprogesterones (i.e. 9α,21-difluoro-11β,17α-dihydroxyprogesterone, 9α-chloro-21-fluoro-11β,17α-dihydroxyprogesterone, 9α-bromo-21-fluoro-11β,17α-dihydroxyprogesterone and 9α-iodo-21-fluoro-11β,17α-dihydroxyprogesterone), 9α-halo-21-fluoro-11-keto - 17α - hydroxyprogesterones (i.e. 9α,21-difluoro-11 - keto - 17α - hydroxyprogesterone, 9α-chloro-21-fluoro-11-keto-17α-hydroxyprogesterone, 9α-bromo-21-fluoro-11-keto-17α-hydroxyprogesterone, and 9α-iodo-21-fluoro-11-keto-17α-hydroxyprogesterone), 2-methyl-9α-halo-21-fluoro-11β,17α - dihydroxyprogesterones (i.e. 2-methyl-9α,21-difluoro-11β,17α - dihydroxyprogesterone, 2-methyl-9α-chloro-21-fluoro-11β,17α-dihydroxyprogesterone, 2-methyl-9α-bromo-21-fluoro - 11β,17α - dihydroxyprogesterone and 2-methyl-9α-iodo-21-fluoro-11β,17α-dihydroxyprogesterone), and 2-methyl-9α-halo-21-fluoro-11-keto-17α - hydroxyprogesterones (e.g., 2-methyl-9α,21-difluoro-11-keto - 17α - hydroxyprogesterone and 2-methyl-9α-chloro-21-fluoro-11-keto-17α-hydroxyprogesterone).

To prepare the 21-fluoro compounds of this invention, a steroid of the general formula:

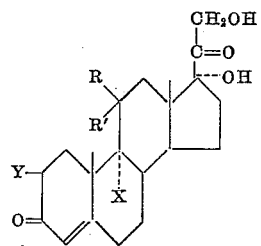

wherein Y, R, R', and X are as hereinbefore defined, is reacted with an alkanesulfonyl halide. Representative steroids suitable as initial reactants in the process of this invention include 9α-halohydrocortisones (i.e., 9α-fluorohydrocortisone, 9α-chloro-hydrocortisone, 9α - bromohydrocortisone and 9α-iodohydrocortisone), 9α-halocortisones (i.e., 9α-fluorocortisone, 9α-chlorocortisone, 9α-bromocortisone and 9α-iodocortisone), 2-methyl-9α-halohydrocortisones (i.e., 2-methyl-9α-fluorohydrocortisone, 2-methyl-9α-chlorohydrocortisone, 2-methyl-9α - bromohydrocortisone, and 2-methyl-9α - iodohydrocortisone), and 2-methyl-9α-halocortisones (e.g., 2-methyl-9α-fluorocortisone and 2-methyl-9α-chlorocortisone).

These steroids are reacted with an alkanesulfonyl halide (sulfonyl chlorides are preferred, but other halides such as bromides and iodides may be used). Although any alkanesulfonyl chloride may be used, the alkane group is preferably a lower alkane, methanesulfonyl chloride (mesyl chloride) being particularly preferred. The reaction is carried out by intermixing the steroid and sulfonyl halide under substantially anhydrous conditions and preferably in the cold (e.g., at a temperature less than about 20° C.) in the presence of pyridine or other organic base.

The reaction results in the production of intermediate steroids containing in the 21-position and alkanesulfonyloxy radical which corresponds to the alkanesulfonyl halide used in the reaction. The preferred intermediate 21-alkanesulfonyloxy compounds are those of the following general formula:

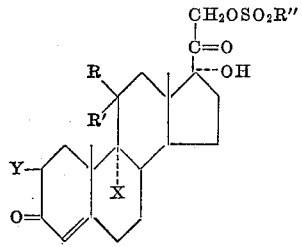

wherein R″ is alkyl (preferably lower alkyl) and Y, R, R' and X are as hereinbefore defined.

These 21-alkanesulfonyloxy intermediates are then reacted with an alkali metal fluoride (particularly potassium fluoride) in an organic solvent of high dielectric constant, such as dimethylformamide or dimethylsulfoxide. This reaction is preferably, but not necessarily, conducted at elevated temperature, a temperature range of 100–130° C. being preferred. The reaction yields the 21-fluoro final products of this invention.

If the starting steroid contains an 11β-hydroxy group, and an 11-keto steroid is desired as the final product, the former can be oxidized in the usual manner, as by treating with a hexavalent chromium compound (e.g., chromic acid) in an acid medium (e.g., glacial acetic acid).

The steroids of this invention are physiologically active steroids which possess glucocorticoid activity. Thus, the new steroids of this invention can be administered instead of, and in the same manner as, cortisone or hydrocortisone in the treatment of rhumatoid arthritis and dermatomyositis. The dosage for such administration is, of course, dependent on the relative activity of the compound.

The following examples are illustrative of the invention (all temperatures being in centigrade):

EXAMPLE 1

$9\alpha$-21-Difluoro-$\Delta^4$-Pregnene-11$\beta$,17$\alpha$-Diol-3,20-Dione To a solution of 200 mg. of 9$\alpha$-fluorohydrocortisone 21-mesylate in 5 ml. of redistilled dimethylformamide is added 200 mg. of anhydrous potassium fluoride and the resulting suspension heated with stirring at 110° for 18 hours. The mixture is concentrated to small volume, taken up in water and extracted with ethyl acetate. The ethyl acetate extract is in turn extracted with water and the solvent removed in vacuo. The residue is triturated with chloroform and the chloroform-insoluble precipitate recrystallized from 95% alcohol. Pure 9$\alpha$,21-difluoro-$\Delta^4$-pregnene-11$\beta$,17$\alpha$-diol-3,20-dione has the following properties: M.P. about 259–261°; [$\alpha$]$_D^{23}$+147° (c, 0.3 in dioxane), +134° (c, 0.53 in acetone);

$\lambda_{max.}^{alc.}$ 239 m$\mu$ ($\epsilon$=16,400), $\lambda_{max.}^{Nujol}$ 2.89$\mu$, 3.04$\mu$, 5.84$\mu$, 6.01–6.05$\mu$

*Analysis.*—Calcd. for $C_{21}H_{28}O_4F_2$ (382.43): C, 65.95; H, 7.38; F, 9.94. Found: C, 65.96; H, 7.43; F, 9.87.

9$\alpha$,21-difluoro-$\Delta^4$-pregnene-11$\beta$,17$\alpha$-diol-3,20-dione possesses about five to seven times the activity of cortisone acetate in the liver glycogen assay.

Upon concentration of the chloroform solution, from which the insoluble 21-fluoro compound has been removed, in vacuo and recrystallization of the residue from 95% ethanol, there is obtained a product having the following properties: M.P. about 272–274°; [$\alpha$]$_D^{23}$+162° (c, 0.57 in chloroform);

$\lambda_{max.}^{alc.}$ 237 m$\mu$ ($\epsilon$=18,300);

$\lambda_{max.}^{Nujol}$ 3.00$\mu$, 5.55$\mu$, 6.05$\mu$, 6.10$\mu$, 6.19$\mu$

*Analysis.*—Calcd. for $C_{21}H_{27}O_4F$ (362.43): C, 69.61; H, 7.51; F, 5.37. Found: C, 69.77; H, 7.77; F, 5.65.

The procedure of Example 1 can be conducted with dimethylsulfoxide instead of dimethylformamide to give the same results.

EXAMPLE 2

$9\alpha,21$-Difluoro-$\Delta^4$-Pregnene-17$\alpha$-ol-3,11,20-Trione

To a solution of 100 mg. of 9$\alpha$,21-difluoro-$\Delta^4$-pregnene-11$\beta$,17$\alpha$-diol-3,20-dione in 5 ml. of glacial acetic acid is added a solution of 40 mg. of chromic acid in 4 ml. of acetic acid. A half-hour later, 0.5 ml. of methanol is added, and the resulting mixture is concentrated in vacuo. The residue is taken up with water, and extracted with ethyl acetate. After drying over sodium sulfate and evaporation of the solvent in vacuo, the residue is crystallized from 95% ethanol to give pure 9$\alpha$,21-difluoro-$\Delta^4$-pregnene-17$\alpha$-ol-3,11,20-trione.

EXAMPLE 3

$9\alpha$-Chloro-21-Fluoro-$\Delta^4$-Pregnene-11$\beta$,17$\alpha$-Diol-3,20-Dione Following the procedure of Example 1, but substituting 200 mg. of 9$\alpha$-chloro-hydrocortisone 21-mesylate for the 9$\alpha$-fluoro-hydrocortisone 21-mesylate, 9$\alpha$-chloro-21-fluoro-$\Delta^4$-pregnene-11$\beta$,17$\alpha$-diol-3,20-dione is obtained.

EXAMPLE 4

$9\alpha$-Bromo-21-Fluoro-$\Delta^4$-Pregnene-11$\beta$,17$\alpha$-Diol-3,20-Dione Following the procedure of Example 1, but substituting 200 mg. of 9$\alpha$-bromo-hydrocortisone 21-mesylate for the 9$\alpha$-fluoro-hydrocortisone 21-mesylate, 9$\alpha$-bromo-21-fluoro-$\Delta^4$-pregnene-11$\beta$,17$\alpha$-diol-3,20-dione is obtained.

EXAMPLE 5

$9\alpha$-Iodo-21-Fluoro-$\Delta^4$-Pregnene-11$\beta$,17$\alpha$-Diol-3,20-Dione Following the procedure of Example 1, but substituting 200 mg. of 9$\alpha$-iodo-hydrocortisone 21-mesylate for the 9$\alpha$-fluoro-hydrocortisone 21-mesylate, 9$\alpha$-iodo-21-fluoro-$\Delta^4$-pregnene-11$\beta$,17$\alpha$-diol-3,20-dione is obtained.

EXAMPLE 6

$9\alpha$-Chloro-21-Fluoro-$\Delta^4$-Pregnene-17$\alpha$-Ol-3,11,20-Trione

Following the procedure of Example 2, but substituting 9$\alpha$-chloro-21-fluoro-$\Delta^4$-pregnene-11$\beta$,17$\alpha$-diol-3,20 - dione for the steroid reactant in that example, there is obtained 9$\alpha$-chloro-21-fluoro-$\Delta^4$-pregnene-17$\alpha$-ol-3,11,20-trione.

Similarly, 9$\alpha$-bromo-21-fluoro-$\Delta^4$-pregnene - 11$\beta$,17$\alpha$-diol-3,20-dione and 9$\alpha$-iodo-21-fluoro-$\Delta^4$-pregnene - 11$\beta$, 17$\alpha$-diol-3,20-dione can be converted to 9$\alpha$-bromo-21-fluoro-$\Delta^4$-pregnene-17$\alpha$-ol-3,11,20-trione and 9$\alpha$-iodo-21-fluoro-$\Delta^4$-pregnene-17$\alpha$-ol-3,11,20-trione, respectively.

EXAMPLE 7

$9\alpha,21$-Difluoro-2-Methyl-11$\beta$,17$\alpha$-Dihydroxyprogesterone (a) Preparation of 9$\alpha$-fluoro-2-methylhydrocortisone 21-mesylate: To a solution of 13 mg. of 9$\alpha$-fluoro-2-methylhydrocortisone in 0.5 ml. of anhydrous pyridine is added at 0°, 0.05 ml. of methanesulfonyl chloride. After 2.5 hours at 0°, water is added and the resulting mixture is extracted with dilute hydrochloric acid, dilute sodium bicarbonate and water. The chloroform extract is dried over sodium sulfate and evaporated to dryness in vacuo. The residual syrup represents essentially pure 9$\alpha$-fluoro-2-methylhydrocortisone 21-mesylate and is used in the process of Step b without further purification.

(b) Preparation of 9$\alpha$,21-difluoro-2-methyl-11$\beta$,17$\alpha$-dihydroxyprogesterone: A mixture containing 100 mg. of 9$\alpha$-fluoro-2-methylhydrocortisone mesylate and 100 mg. of anhydrous potassium fluoride in 4 ml. of freshly distilled dimethylformamide is heated under nitrogen at 110° for 17 hours. After removal of the bulk of the solvent in vacuo, the mixture is taken up in water and chloroform, the chloroform solution washed with water, dried over sodium sulfate and the solvent removed in vacuo. The residual solid is then recrystallized from 95% alcohol.

Similarly, by substituting an equivalent amount of 9$\alpha$-chloro-2-methylhydrocortisone, 9$\alpha$-bromo - 2 - methylhydrocortisone and 9$\alpha$-iodo-2-methylhydrocortisone for the 9$\alpha$-fluoro-2-methylhydrocortisone in Step a of Example 7 and following the procedure of the example, the corresponding 9$\alpha$-chloro, 9$\alpha$-bromo and 9$\alpha$-iodo derivatives are formed, respectively.

EXAMPLE 8

$9\alpha,21$-Difluoro-2-Methyl-11-Keto-17$\alpha$-Hydroxyprogesterone

To a solution of 25 mg. of 9$\alpha$,21-difluoro-2-methyl-11$\beta$,17$\alpha$-dihydroxyprogesterone in 2 ml. of glacial acetic acid is added over a period of 15 minutes a solution of 12 mg. of chromic acid in 2 ml. of acetic acid. After an additional 10 minutes at room temperature, 0.2 ml. of alcohol is added to destroy excess chromium trioxide and the solution concentrated in vacuo to small volume. The residual syrup is distributed between chloroform and water, and the chloroform solution washed with water, dilute sodium bicarbonate solution and again with water. After drying over sodium sulfate, the solvent is removed in vacuo and the crystalline residue consisting of 9$\alpha$,21-difloro-2-methyl-11-keto-17$\alpha$-hydroxyprogesterone is recrystallized from 95% ethanol.

The invention may be otherwise embodied within the scope of the appended claims.

What is claimed is:
1. A steroid of the general formula:
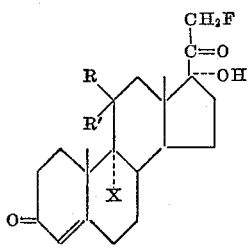
wherein, R is hydrogen, R' is β-hydroxy and together R and R' is keto, and X is halogen.
2. 9α-halo-21-fluoro-11β,17α-dihydroxyprogesterone.
3. 9α-halo-21-fluoro-17α-hydroxy-11-ketoprogesterone.
4. 9α,21-difluoro-11β,17α-dihydroxyprogesterone.
References Cited in the file of this patent
UNITED STATES PATENTS
3,005,837    Lincoln et al. _____ Oct. 24, 1961